Feb. 20, 1968   R. S. BRADSHAW   3,369,661

MAIL HANDLING AND SEPARATING APPARATUS

Filed Dec. 18, 1964

INVENTOR.
ROBERT S. BRADSHAW

BY

Carl Fissell Jr.
AGENT

United States Patent Office 3,369,661
Patented Feb. 20, 1968

3,369,661
MAIL HANDLING AND SEPARATING
APPARATUS
Robert S. Bradshaw, Broomall, Pa., assignor to Burroughs Corporation, Detroit, Mich., a corporation of Michigan
Filed Dec. 18, 1964, Ser. No. 419,322
8 Claims. (Cl. 209—120)

ABSTRACT OF THE DISCLOSURE

The present invention relates to automatic air culling apparatus for separating relatively large, bulky items from relatively thin, flat, light weight items in which air under pressure moving through a substantially enclosed chamber through upper and lower perforated conveyor members carrying different size and weight items causes the light weight items to adhere to the upper conveyor member while the heavy, bulky items fall by gravity onto the lower conveyor member effectively separating such items for continuous removal from the chamber.

---

The present invention relates to item handling and separating apparatus, and, more particularly, although not necesarily exclusively, to automatic item handling and separating apparatus for use with items such as Post Office mail which includes packages as well as letter documents. With still more specificity, the invention has to do with apparatus for automatically air culling and separating items by relative weight and surface area by means of a pressure differential within and across a confined area into and through which said items are automatically transported.

More particularly, the invention has to do with automatic air culling and removal from "raw" or unsorted collection mail all packages and similar documents which cannot be machine processed and the removal of special items of a size which cannot be automatically handled, leaving behind only items such as letters, postcards and other similar documents within a particular size range which may be processed by automatic machines.

In general, it has been found desirable in automating the item separation and handling of packages and letters to first separate the letters from the packages and then to remove oversize and "special" letters from the letter documents. A number of different approaches have been suggested, some of which have failed completely, and a few of which have been of relatively limited success. One such known apparatus includes a horizontal conveyor belt with a rotatable drum mounted above the belt with its axis horizontal and at angle with respect to the direction of travel of the belt. The bottom of the drum is located a slight predetermined distance, e.g., a quarter of an inch above, and is rotated in a direction opposite to the travel of the belt. Items such as mail, traveling on a conveyor belt which is less than a quarter of an inch thick, passes easily under the drum, while larger size items such as packages and mail over a quarter of an inch thick is swept off of the side of the belt by the counter rotating drum.

A definite disadvantage of equipment such as this is the danger of damaging the mail. Also, there is the added risk that it tends in some instances, at least, to remove letters together with the packages. Other apparatus which is used to separate letters from packages employ vibrating and/or rotating elements of various descriptions, to attempt to provide some automatic separation of the individual pieces of mail. So far as is known, none of these devices have achieved wide commercial success.

It is an important object of the present invention therefore to solve these and other associated problems of item package and document separation by new, novel and heretofore unknown means.

Another important object of the invention is to provide item handling and separating apparatus utilizing a flow of air across a confined area in order to separate letters from packages by operating on the weight to surface area ratio variations therebetween.

Still another object of the invention is to provide means for automatic air culling and removal of letters from package mail utilizing automatic conveyor belts which are moved into and through a vertical flow of air of a sufficient velocity to cause the lighter items to adhere to and be moved by one of the conveyor belts while those of a heavier weight are automatically deposited by gravity onto a second conveyor belt likewise to be removed from the air flow.

In accordance with the foregoing objects and first briefly described, the present invention provides automatic air culling apparatus in which a vertical, relatively high velocity, flow of air is forced through an enclosed chamber through which perforated or screen type conveyor belts transport raw unsorted items, e.g., mail. The air from the pressure side of the chamber is caused to pass upwardly through the conveyor belts into the vacuum side of the chamber effectively producing a pressure differential and gradient therebetween causing the lighter items, e.g., the letters, postcards, etc., to adhere to the upper conveyor belt and be removed from the incoming stream of items while the heavier items, e.g., packages, etc., are separated therefrom and fall by gravity onto the lower belt likewise to be removed from the chamber.

These and other objects and advantages of the present invention will appear more clearly from a reading of the specification and claims when taken in conjunction with the accompanying drawings wherein:

Figure 1:
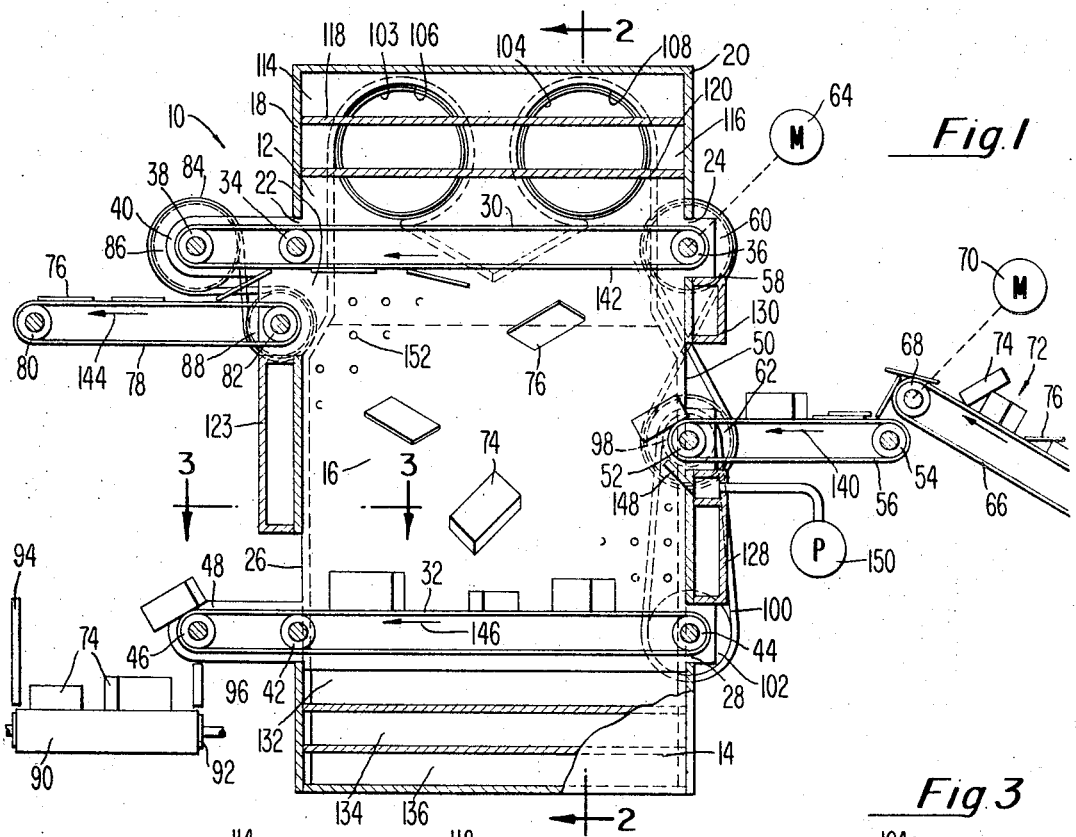
FIGURE 1 is a side elevational view of apparatus employing the present invention with the front wall broken away to expose the interior to view.

Referring to the drawings, and particularly to FIGURE 1, wherein a preferred embodiment of the apparatus 10 employing the present invention is shown, there is illustrated a hollow, box-like, multiwalled chamber 12 including front, back and opposite side walls 14, 16, 18 and 20 respectively. Each of the two opposite side walls 18 and 20 is provided with suitable upper and lower pairs of apertures 22, 24, 26 and 28, respectively so as to permit the ingress and egress of "upper" and "lower" conveyor belts 30 and 32 by means of which items such as packages and letters, etc., may be introduced into and removed from chamber 12.

As seen in FIGURE 1, oppositely disposed pairs of elongated rollers 34 and 36, suitably journalled by means not shown, in the respective end walls 18 and 20 of chamber 12, are operably associated with a third elongated roller 38 disposed on out-rigger arms 40, by means of the wide, flat, relatively thin screen type conveyor belt or web 30 of suitable open mesh construction effective to permit pressurized air to flow therethrough, as described hereinafter. A lower pair of elongated rollers 42 and 44, disposed adjacent to apertures 26 and 28 respectively, are operably associated with a third elongated roller 46 on outrigger arms 48 through the medium of the screen type conveyor belt 32 similar to conveyor belt 30.

Located in side wall 20, of chamber 12, is a relatively large opening 50, for purposes which will be more readily apparent hereinafter. Disposed along the lower edge of opening 50 is an elongated roller 52 operably associated with a second such roller 54 and together carrying a relatively short, wide, flat conveyor belt 56. A drive belt 58 carried by pulleys 60 and 62 (on the shafts of rollers 36 and 52 respectively) and driven by motor 64 transmits rotative torque to conveyor belt 56. Belt 58 is twisted 180° as shown, to provide the proper direction of rotation of pulley 62. Located adjacent one end of conveyor belt 56 is an angled "incoming" conveyor belt 66 carried over roller 68 and suitably driven by means of an associated electric motor 70. Movement of belt 66 causes items such as "raw," unsorted mail 72 which includes packages 74 and letters 76, to be automatically deposited onto the upper surface of the horizontally disposed short length belt 56 for automatic movement into and through opening 50 into the interior of chamber 12, as hereinafter described.

Located adjacent to an slightly below drive roller 34, at the left in FIGURE 1, is an auxiliary conveyor belt 78 operably associated with rollers 80 and 82. A drive belt 84 (twisted 180° as is belt 58), carried by pulley 86 on the same shaft as roller 38 is operably linked to pulley 88 on the shaft of roller 82, so as to rotate belt 78 causing items 76 which are carried thereby to be moved leftwardly (FIGURE 1) out of chamber 12.

At the base of chamber 12, on the left side thereof (FIGURE 1) is located a second auxiliary conveyor belt 90 carried over roller 92 and provided with elongated side wall extensions 94 and 96, on opposite parallel sides thereof, and adapted to be movd horizontally in a direction at right angles to the plane of movement of the other belts, as seen in FIGURE 1. Suitable electro-mechanical drive means is provided for operating conveyor belt 90 and may take the form of an electric motor, not shown, suitably shaft or gear coupled to drive pulley 92.

A small pulley wheel 98, middle right of FIGURE 1, coupled to and rotatable with the shaft carrying roller 52 for driving belt 56, carries a short drive belt 100 operably coupled to pulley wheel 102 on the shaft of roller 44 for driving belt 32 at a diffrent (slower) relative rate of speed than belts 56 and 30, for purposes to be described later on herein.

A vertical flow of air is employed with the present invention in order to provide a pressure differential across the area extending substantially from the bottom to the top of the interior of chamber 12. The volume of air within the chamber 12 is placed under vacuum by means of a pair of high-speed, high-velocity fans 103 and 104, e.g., of the squirrel-cage variety, located at the back of the cabinet adjacent the upper transverse edge thereof and opening outwardly through wall 16 through orifices 106–108 into a relatively large central vertical duct 110. Each fan is driven by its own motor 112.

Figure 2:
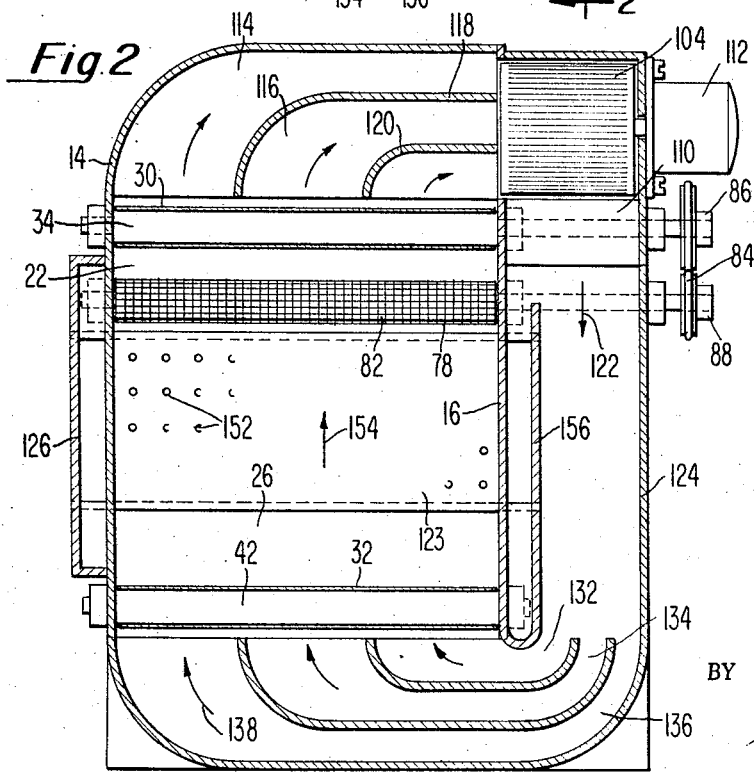
FIGURE 2 is a sectional view taken along the line 2—2 of FIGURE 1.
Figure 3:
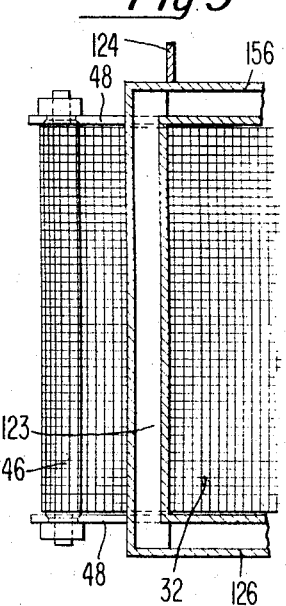
FIGURE 3 is a sectional view along the line 3—3 of FIGURE 1.

The air, at high velocity, is sucked up from the bottom of chamber 12 and into and through ducts 114 and 116 formed by the duct work 118, 120 out across the top of the chamber and into and through the fans, thence downwardly, arrows 122, via the double wall ducting 123, 124, 126, 128 and 130 extending around the periphery of the cabinet, as shown, to enter the lower portion of the chamber through a plurality of ducts or tunnels 132, 134 and 136 in the direction of arrows 138. The inlet for the interior chamber portion of the double wall chamber is defined by wall members 16 and 156 as illustrated in FIG. 2. This arrangement provides an air entrance to the double wall cavity leading to the orifices 152. It is to be noted that chamber 12 is surrounded on all four sides by the secondary walls and the orifices 152 are provided in all four confronting walls. The main portion of the air passes between walls 124 and 156 in the direction of the arrow 122 and generally flows upwardly from the bottom of the chamber 12 following arrow 138 through the conveyor belts exiting in the direction of the upper arrows. The air is driven by the fans 103–104 at a velocity of e.g., 800–1000 f.p.m. so as to penetrate the screen type conveyor belts 30 and 32, after which it is withdrawn from the chamber by the fans and recirculated.

In operation of apparatus 10 embodying the invention, incoming unsorted or "raw" mail 72 which as beforementioned, includes both multi-size packages 74 and letter mail 76 of varying surface area and weight enter the chamber 12 in the direction of the arrow 140 via inclined conveyor belt 66 and are in a relatively jumbled and somewhat compacted mass. By causing this mass of material to drop onto conveyor belt 56, which is moving at a relatively higher speed than conveyor belt 66, a suitable separation is automatically provided between items by virtue of the relative speed of the two conveyor belts with respect to one another. Thereafter, the items are caused to move at this higher speed, leftwardly in FIGURE 1, through the inlet aperture or orifice 50 into chamber 12. As the items enter the chamber the air culling apparatus of the present invention separates the lighter weight documents from the heavier weight packages, as a result of the velocity head or pressure of the moving air stream being converted to a static pressure as the air comes into contact with the surface of the document. If this static pressure of the air on the document is greater than the weight of the document divided by its surface area, then the document will be suitably elevated or lifted into the air stream to impinge upon the lower surface 142 of the upper conveyor belt 30, to which it will adhere. Movement of the belt leftwardly, as shown, causes the items to exit through the opening 22 to fall by gravity onto conveyor belt 78 by means of which they are moved at relatively high speed in the direction of the arrow 144, leftwardly to some collection apparatus, e.g., a bin in which the letter mail is receivable or to some other adjacent piece of item handling equipment.

If, on the other hand, the weight to surface area ratio of the document exceeds the velocity head or pressure of the air flowing upwardly through the system toward the vacuum end of chamber 12, then the items falls by gravity in the air stream and is received on the lower conveyor belt 32 together with packages, if any, of higher weight, to be moved leftwardly in the direction of the arrow 146, onto conveyor belt 90 to be carried to an associated package disposal area for further handling.

The illustrated embodiment of the apparatus is directed to the case where the surface of the document is perpendicular to the direction of the air flow. It has been observed in operation of the apparatus however, that even though the flight of the items may be erratic in the air stream, and even though sometimes the documents are standing on edge, i.e., with the edges perpendicular to the air flow, the overall effect is still that of tending to lift the lighter weight documents toward the upper conveyor belt 30 while permitting the heavier documents and packages to fall by gravity onto the lower belt 32. Letters and similar documents which can be machine processed for separation from packages and other heavy weight articles, tend to be relatively thin and are therefore limited or low in weight to surface area ratio. In contrast to this, packages and other such items which must be culled from the lighter mail are usually thicker and have a relatively large or high weight to surface area ratio. The air velocity required to lift the majority of the letters and allow the majority of packages to fall depends as much as anything else, upon the requirements of the subsequent machines which are to process the letters. However, generally this velocity is seen, as before stated, to be in the range of from 800 to approximately 1000 feet per minute.

In order to avoid the condition which might exist when one or more letters, one on top of the other, enter the air stream, in which case they would have a relatively high weight to surface area ratio and would drop in the air stream as if they were packages, auxiliary means is provided to disperse or scatter the documents so that they will be individually subjected to the air velocity. The preferred means is the combination of the high speed conveyor belt 56 and the lower speed conveyor belt 66 and a row of high velocity air jets or nozzles 148 only one of which is shown at lower right in FIGURE 1, located at the entrance 50 to the air chamber immediately adjacent the entering end of the auxiliary belt 56.

The jets 148 are or may be angled slightly upwardly as shown, for more efficient dispersion of the air stream therefrom and are fed with air from a source of compressed air by means of a suitable pump 150. The high speed conveyor belt 56 spreads the mail as it is received from the lower speed source belt 66 into a distribution pattern having more spaces between documents and having little or no overlap of documents. The items thus entering the air chamber at the velocity of the high speed belt also have more of a tendency to scatter or be dispersed as they enter the air stream. The angular position of the high velocity air jets 148 at the entrance 50 cause the exiting air to strike the documents at a relatively sharp angle as they leave conveyor belt 56 so as to agitate the same or impart a tumbling motion thereto thus to aid in the dispersion thereof.

It is also possible to include one or more or a number of barriers, not shown, in the downward path of the documents in such a manner that as the documents fall they would strike the barriers and be additionally tumbled thereby. It might also be desirable to use a power driven mechanism which would be of use to agitate the items. Such a power driven device as a rotating brush, not shown, might be placed on the feed conveyor belt 56 which would sweep the mail and produce a single layer of documents before mail enters the air chamber.

As seen in FIGURE 2, and as earlier mentioned herein, the side walls of chamber 12 are vented by means of multiple orifices 152 arranged over the entire wall surface so as to bring pressurized air into the chamber 12 from the pressure side of the fans through the double wall ducting. This construction avoids the problem caused by plane surface walls wherein items which come into contact therewith become stagnant in the boundary air layer, and tend to slide or move downwardly along such boundary layer or even to adhere thereto and thus be prevented from removal onto the exiting conveyor belts. The wall orifices or vents 152 prevent this from occurring and provide a flow of air through the openings which keeps the letters or other items from coming into contact with the walls and thereby maintains the items in the active air stream, arrow 154. Wall 16 is provided with a secondary scoop-like member 156 adjacent to and parallel therewith so as to bring the pressurized air to the orifices of this wall. The air coming from the sides and bottom of the chamber and moving in the direction of the arrow 154 tends to be constricted as it moves vertically upwardly therethrough. This constriction effect produces a change in velocity due to the side wall effect and together with the conveyor belts 30 and 32 effectively produces a pressure gradient within the chamber.

The present apparatus has a number of advantages not the least of which is that air culling causes the letters approaching the upper conveyor belt 30 to be preferentially attracted to areas of the belt not previously covered with documents. The conveyor belt is limited in width and the velocity of the belt is such that the output of letters approaches a continuous flow of single documents. This type of output considerably simplifies subsequent equipment which is required to edge align and separate the letters into a continuous flow for further processing or handling.

A certain of amount of air received from the vacuum chamber is exhausted to the outside in order to compensate for the air which enters the side openings. This exhausted air may be removed from the outside radius of the blower housing where centrifugal force causes a concentration of dust and debris particles. These particles are then removed from the exhaust air by conventional air filter means, not shown. This feature provides a means of removing paper dust and other similar foreign particles from the mail which would normally contaminate the mail processing equipment.

What is claimed is:

1. Item handling and separating apparatus comprising:
 (a) a vertically elongated chamber having vertically displaced outlet openings and an inlet opening located at a level intermediate said outlet openings into and through which items such as mail and packages may be conveyed and from which such items may be removed in separate though accumulated serial fashion,
 (b) means for creating a pressure differential and gradient through said chamber effective to produce an entering pressure through an air inlet opening at the bottom of said chamber and a departing vacuum effect resulting therefrom through an air outlet opening at the top of said chamber whereby there is provided a distributed flow of air upwardly through said chamber at a constant velocity,
 (c) first means adjacent one side of said chamber and operably associated with said inlet opening for moving items into said chamber,
 (d) second means for feeding said items onto said first means, said second means moving said items at a different relative rate so that the items are caused to be separated by a desired amount depending on the relative rates of movement between said two means,
 (e) movable means within said chamber operatively associated with the uppermost one of said item outlet openings and positioned below said air outlet opening for intercepting relatively lighter items conveyed upwardly by said flow of air through said chamber and for conveying said intercepted lighter items out of said chamber, and
 (f) movable means within said chamber operatively associated with the lowermost one of said item outlet openings and positioned above said air inlet opening for intercepting relatively heavier items which fall downwardly through the flow of air by force of gravity and for conveying said heavier items out of said chamber through said outlet opening.

2. The invention in accordance with claim 1 wherein said means creating a pressure gradient through said chamber includes a pair of relatively high speed fans operably associated with said chamber.

3. Item handling and separating apparatus comprising:
 (a) a vertically elongated chamber having vertically displaced outlet openings and an inlet opening located at a level intermediate said outlet openings into and through which items such as mail and packages may be conveyed and from which such items may be removed in separate though accumulated serial fashion,
 (b) means for creating a pressure differential and gradient through said chamber effective to produce an entering pressure through an air inlet opening at the bottom of said chamber and a departing vacuum effect resulting therefrom through an air outlet opening at the top of said chamber thereby providing a distributed flow of air upwardly through said chamber at a constant velocity,
 (c) first means adjacent one side of said chamber and operably associated with said inlet opening for moving items rapidly into said chamber,
 (d) second means for feeding said items onto said first means, said second means moving said items at a relatively slower rate so that items are caused to be separated by a desired amount depending on the relative rates of movement between said two means,
 (e) movable means within said chamber operatively associated with the uppermost one of said item outlet openings and positioned below said air outlet opening for intercepting relatively lighter items conveyed upwardly by said flow of air and for conveying said intercepted items out of said chamber, and
 (f) movable means within said chamber operatively associated with the lowermost one of said item outlet openings and positioned above said air inlet opening for intercepting relatively heavier items which fall downwardly through the flow of air by force of gravity and for conveying said heavier items out of said chamber through said outlet opening.

4. The invention in accordance with claim 3 wherein said means for moving items through and out of said chamber comprises a plurality of screen type conveyor belts through which air can be forced at relatively high velocities with little or no obstruction except for the items being handled thereby.

5. Item handling and separating apparatus comprising:
   (a) a vertically elongated chamber having vertically displaced outlet openings and an inlet opening located at a level intermediate said outlet openings into and through which items such as mail and packages may be conveyed and from which such items may be removed in separate though accumulated serial fashion,
   (b) means for creating a pressure differential through said chamber effective to produce an entering pressure through an air inlet opening at the bottom of said chamber and a departing vacuum through an air outlet opening at the top of said chamber thereby providing a distributed flow of air upward through the chamber at a constant velocity,
   (c) first means adjacent one side of said chamber and operably associated with said inlet opening for moving items rapidly into said chamber,
   (d) second means for feeding said items onto said first means, said second means moving said items at a relatively slower rate so that the items are caused to be separated by a desired amount depending on the relative rates of movement of the said two means,
   (e) means in said chamber for actively displacing said items relative to one another preventing overlap of items,
   (f) movable means within said chamber operatively associated with the uppermost one of said item outlet openings and positioned below said air outlet opening for intercepting relatively lighter items conveyed upwardly by said flow of air and for conveying said intercepted items out of said chamber, and
   (g) means within said chamber operatively associated with the lowermost one of said item outlet openings and positioned above with said air inlet opening for intercepting relatively heavier items which fall downwardly through the flow of air by force of gravity and for conveying said heavier items out of said chamber through said outlet opening.

6. The invention in accordance with claim 5 wherein said chamber is provided with double wall ducts surrounding the active portion thereof and wherein the inner walls adjacent to said double wall ducts are provided with multiple orifices effective to ventilated the same and avoid adherence thereto of the items being handled therein.

7. Item handling and separating apparatus comprising:
   (a) a vertically elongated chamber having vertically displaced outlet openings and an inlet opening located at a level intermediate said outlet openings into and through which items such as mail and packages may be conveyed and from which such items may be removed in separate though accumulated serial fashion, and including means venting said walls to the internal atmosphere of said chamber,
   (b) means for creating a pressure differential through said chamber effective to produce an entering pressure through an air inlet opening at the bottom of said chamber and a departing vacuum through an air outlet opening at the top of said chamber thereby to provide a distributed flow of air upwardly through said chamber at a constant velocity,
   (c) means surrounding the walls of said chamber for applying air under pressure thereto for venting the same through said venting means into said chamber,
   (d) first means adjacent one side of said chamber and operably associated with said inlet opening for moving items rapidly into said chamber,
   (e) second means for feeding said items onto said first means, said second means moving said items at a relatively slower rate so that the items are caused to be separated by a desired amount depending on the relative rates of movement of said two means,
   (f) movable means within said chamber operatively associated with the uppermost one of said item outlet openings and positioned below said air outlet opening for intercepting relatively lighter items conveyed upwardly by said flow of air and for conveying said intercepted items out of said chamber, and
   (g) movable means within said chamber operatively associated with the lowermost one of said item outlet openings and positioned above said air inlet opening for intercepting relatively heavier items which fall downwardly through the flow of air by force of gravity and for conveying said heavier items out of said chamber through said outlet opening.

8. The invention in accordance with claim 7 wherein said chamber is further provided with a plurality of air nozzles adjacent to said high speed item moving means and wherein said nozzles further include means operably associated therewith for applying air under pressure thereto from a source of external air.

References Cited

UNITED STATES PATENTS

| | | | |
|---|---|---|---|
| 1,160,791 | 11/1915 | Van Houten | 198—76 |
| 2,294,086 | 8/1942 | Hinds | 209—147 X |
| 3,164,548 | 1/1965 | Rowell | 209—139 |
| 3,220,550 | 11/1965 | Gilbert | 209—120 |

FRANK W. LUTTER, *Primary Examiner.*